United States Patent
Richter et al.

(10) Patent No.: US 7,378,158 B2
(45) Date of Patent: May 27, 2008

(54) STRUCTURAL COMPONENT COATED WITH A HARD MATERIAL AND COMPRISING AN INTERMEDIATE LAYER FOR IMPROVING THE ADHESIVE STRENGTH OF THE COATING

(75) Inventors: Gert Richter, Remchingen (DE); Michael Fripan, Backnang (DE); Daniel Von Buren, Niedergosgen (CH)

(73) Assignee: CeramTec AG, Plochingen (DE)

( * ) Notice: Subject to any disclaimer, the term of this patent is extended or adjusted under 35 U.S.C. 154(b) by 0 days.

(21) Appl. No.: 10/467,488

(22) PCT Filed: Feb. 26, 2002

(86) PCT No.: PCT/EP02/02026

§ 371 (c)(1),
(2), (4) Date: Jan. 16, 2004

(87) PCT Pub. No.: WO02/083984

PCT Pub. Date: Oct. 24, 2002

(65) Prior Publication Data
US 2004/0137279 A1   Jul. 15, 2004

(30) Foreign Application Priority Data
Feb. 28, 2001   (DE) ................. 101 09 523

(51) Int. Cl.
*C23C 30/00* (2006.01)
(52) U.S. Cl. ............... 428/472; 427/255.3; 427/419.1; 427/419.2; 428/336; 428/469; 428/698
(58) Field of Classification Search ............... 428/472, 428/469, 698, 701, 336; 427/419.1, 419.2, 427/255.3
See application file for complete search history.

(56) References Cited

U.S. PATENT DOCUMENTS

| | | | |
|---|---|---|---|
| 4,501,786 A | | 2/1985 | Hale |
| 4,943,450 A | * | 7/1990 | Sarin ...................... 427/419.2 |
| 5,145,739 A | * | 9/1992 | Sarin ......................... 428/336 |
| 6,183,846 B1 | * | 2/2001 | Moriguchi et al. ........ 428/216 |

FOREIGN PATENT DOCUMENTS

| | | |
|---|---|---|
| EP | 0 947607 A | 10/1999 |
| EP | 1-191 122 A2 | 3/2002 |
| EP | 1-283 254 A1 | 2/2003 |
| JP | 08-039317 * | 2/1996 |
| WO | WO-99-29920 A | 6/1999 |
| WO | WO-0052225 A | 9/2000 |
| WO | WO-0068453 A | 11/2000 |

\* cited by examiner

*Primary Examiner*—A. A. Turner
(74) *Attorney, Agent, or Firm*—Fulbright & Jaworski L.L.P.

(57) ABSTRACT

Structural components that are subject to high stresses, especially caused by wear, can be protected by coating them with a hard material. For metal-cutting tools it is for example known that their wear resistance can be improved by coating them with a hard material. Different thermal expansion coefficients of the substrate material and the coating material and different layer materials in a multilayer coating may produce great stresses. The stress increases as the thickness of the coating increases, thereby increasing the danger of the coating chipping off. In order to solve this problem, the invention proposes an intermediate layer (5) to be interposed between at least two layers (4, 9) of the coating (3), said intermediate layer mainly or exclusively consisting of a material component (6, 8) of an element of the fourth to eighth subgroup of the fourth and fifth period of the periodic system.

70 Claims, 1 Drawing Sheet

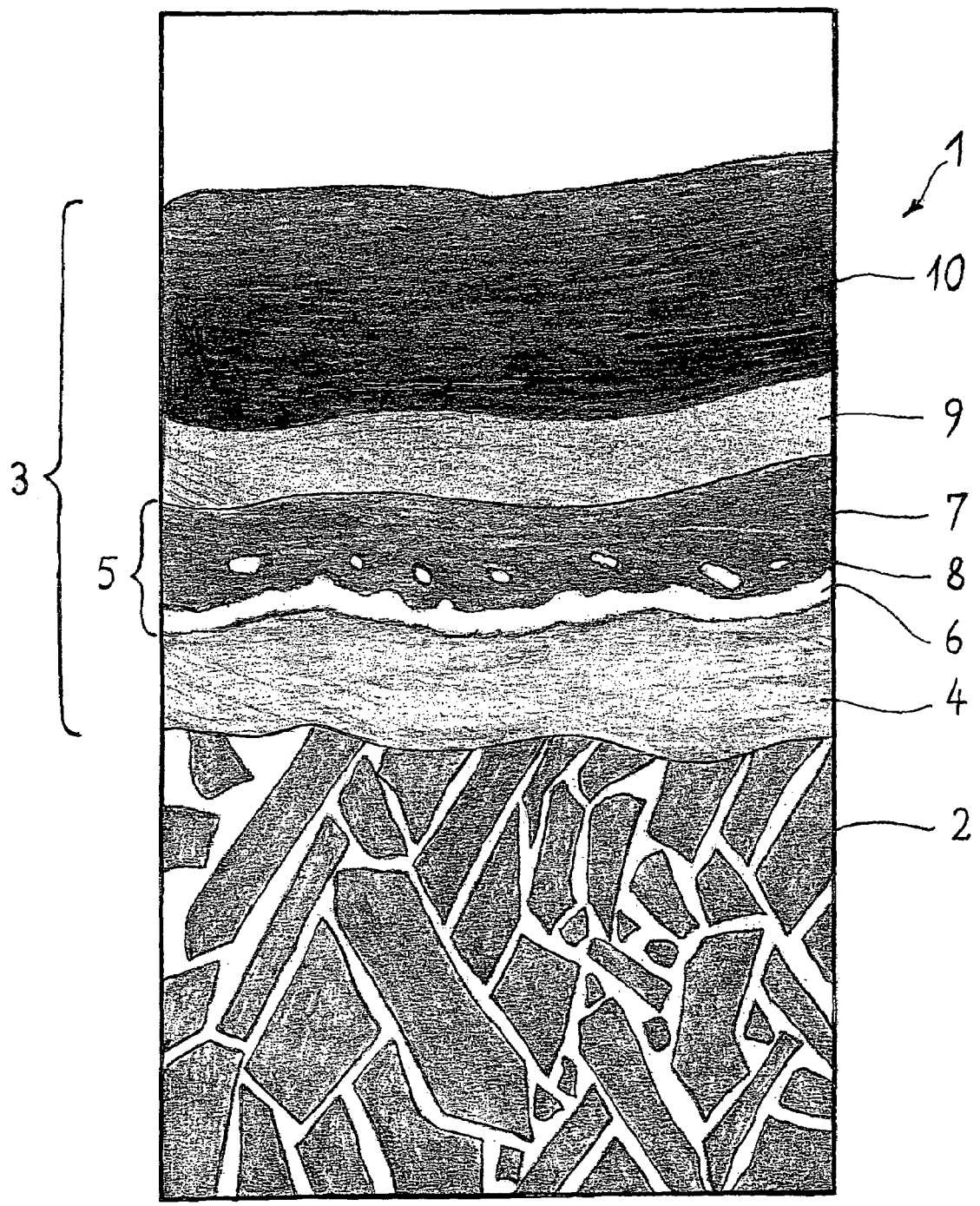

STRUCTURAL COMPONENT COATED WITH A HARD MATERIAL AND COMPRISING AN INTERMEDIATE LAYER FOR IMPROVING THE ADHESIVE STRENGTH OF THE COATING

BACKGROUND AND SUMMARY OF THE INVENTION

The invention relates to a structural component made of a metallic or ceramic material having a coating of hard material, and to processes of preparing these.

Structural components that are subjected to high loads, in particular caused by wear, can be protected by a coating of hard material. In particular the tribochemical and thermochemical reactions between the materials of the work piece and the tool must be largely avoided so that the good mechanical and thermal properties of the material may be exploited to the full. It is therefore already known to improve the wear resistance of, for example, metal-cutting tools by means of a coating of hard material. The coatings are applied not only to metal-removing tools made of metal, in particular high-speed steel (HSS) or hard metal (HM), but also to tools made of ceramic materials, such as, for example, silicon nitride blanking dies. Wear can also be reduced by a coating of hard material in the case of metal-forming tools.

Layer thicknesses within the micrometer range generally suffice for the desired property improvements, in particular in the case of metal-cutting tools. Such layers can be deposited, for example, from the gas phase by the PVD, CVD or plasma CVD processes. Depending on the material, layer thicknesses of a layer of less than 1 µm to over 20 µm are possible by these means.

The processes indicated enable not only single layers of one material to be deposited. Many variations are possible as regards both the number of materials which may be combined together in the layer sequence, and the number of layers. Above all when metal-cutting tools are utilised, layer materials based on titanium, such as, for example, titanium nitride, titanium carbide, titanium oxide, titanium carbon nitride are preferably utilised, as well as layers of one or more modifications of aluminium oxide.

Differences in thermal expansion between the substrate material and the layer material, as well as different layer materials in the case of a coating comprising a plurality of layers, may give rise to high stresses. In particular with increasing coating thickness the stress increases, as consequently does the risk of the coating chipping off.

In order to improve the adhesion strength of a coating it is known, for example from DE 36 08 734 C1, in the case of coated ceramic indexable inserts to deposit an intermediate layer of silicon dioxide on a base body made of sintered ceramic materials which is provided with a ceramic wear layer. This prior art, it must be noted, relates only to coating with one layer.

The object of the present invention is to increase the adhesion strength of the layers of hard material on the substrate material of a structural component made of a metallic or ceramic material as well as that between the layers.

The object is achieved according to the present invention, which relates to a structural component of a metallic or ceramic material coated with a hard material. The coating is a multilayer coating.

BRIEF DESCRIPTION OF THE DRAWING

The drawing shows a schematic representation of a microtome section through a coated structural component made of silicon nitride.

DETAILED DESCRIPTION

A structural component according to the invention having a coating is distinguished in that at least between two layers of the coating an intermediate layer is arranged which comprises predominantly or exclusively a material component of an element in the fourth to eighth sub-group of the fourth and fifth period of the Periodic Table. The number of intermediate layers is matched to the number of layers of the coatings. The thicker a coating is and the greater the number of layers necessary for building up the layer, the more advantageous is the provision of intermediate layers.

In particular the elements from the eighth sub-group of the fourth period are suitable for the formation of an intermediate layer. For example, in the case of layers based on titanium the adhesion strength is preferably increased by intermediate layers comprising a material component of the element cobalt.

A coating of hard material is applied in known manner by the PVD, CVD or plasma-CVD processes from the gas phase. The intermediate layer according to the invention is likewise deposited from the gas phase. For this purpose, the element of the intermediate layer is likewise converted to the gas phase. If, for example, a layer based on titanium such as Ti(C,N) is built up by the CVD process from the gas phase, in order to form an intermediate layer based on a metallic material the metal may be introduced in solid form into the reactor, where it is converted to the gas phase. The deposition of a layer, for example based on titanium, preferably takes place at a temperature of approximately 1000° C. and at a pressure slightly below atmospheric pressure. Under these conditions the metal remains in the gas phase and is not deposited as a layer material. Only when the pressure is reduced is the intermediate layer built up with the metallic material component. This intermediate layer may, depending on the parameters adjusted during the coating, or the available quantity of the metallic material component, be embodied as a cohesive layer or be present in the form of interstitial regions. If the metallic material component supply is exhausted, or if the pressure is again raised to the previous level, the intermediate layer also stops building up. These intermediate layers have a thickness of from 0.05 µm to 5 µm. The stresses within the coating are reduced by an intermediate layer, thus substantially lowering the risk of chipping-off.

The layers generally have a composition such as those which arise in accordance with the known coating processes. Coatings based on titanium generally comprise the following compounds: TiN, Ti(C,N), TiC, TiO, TiON and TiCON.

The coatings may, however, also comprise at least one of the modifications of aluminium oxide.

The coating may be single-phase, that is to say may comprise one material. The coating may also be multi-phase, that is to say may consist of an alternating sequence of layers of different materials, for example based on titanium, and aluminium oxide. Such a coating comprising a plurality of layers may have a thickness of up to 60 µm and more.

Such a coating, also known as a multi-layer coating, could, for example, be built up as follows: one or more layers based on titanium, a layer of aluminium oxide in the α and/or κ modification and optionally one or more covering layers based on titanium, wherein at least between two layers based on titanium an intermediate layer is arranged.

Each of the layers, except the intermediate layer, may, depending on the material used, have a thickness of approximately 10 μm, for example in the case of a layer based on titanium, up to approximately 20 μm, for example in the case of a layer of aluminium oxide, such that layer thicknesses of over 60 μm may be obtained. In order to guarantee the adhesion strength of a coating, for example of such a thickness, at least one intermediate layer is necessary between the layers based on titanium.

The invention advantageously affords the possibility of providing every substrate material, the base material of the tool, whether it be high-speed steel, hard metal or also ceramic materials such as, for example, silicon nitride, SiAlON, aluminium nitride or based on $Al_2O_3$, with a coating which adheres well and substantially reduces wear. Here, the substrate material may be selected in accordance with the desired characteristics.

The invention is explained in greater detail by reference to an Embodiment Example.

The Embodiment Example shows a schematic representation of a microtome section through a coated structural component 1 made of silicon nitride, $Si_3N_4$. On the base material 2 of the structural component 1, the substrate having the light interstices comprising the sintering aids necessitated by production, a coating 3 is located which comprises a plurality of layers, a multi-layer coating. The coating 3 is built up in the present Embodiment Example from four individual layers of differing thicknesses.

On the substrate 2 a layer 4 follows which is based on titanium, in the present Embodiment Example comprising Ti(C,N). During the coating process, as the layers based on titanium are built up, the following known chemical reactions take place: $TiCl_4+1/2N_2=TiN+4HCl$, $TiCl_4+CH_4=TiC+4HCl$ and $TiCl_4+CH_4+½ N_2=Ti(C,N)+4HCl$. This is followed, in clearly visible manner, by the intermediate layer 5, predominantly based on cobalt. Whereas the first layer 4 was deposited at a temperature of approximately 1000° C. and at a pressure of 800 mbar, in the case of this layer 5 the pressure was reduced to below 500 mbar at the same temperature. Whereas first a cohesively dense part layer 6 of the material component cobalt was deposited which was introduced as metal in solid form into the reactor, where it was converted to the gas phase, when the cobalt content is impoverished from the gas to build up the layers based on titanium a part layer 7 forms which comprises predominantly TiC, with interstices 8 of the material component cobalt being still visible. When the coating parameters are changed to the previous state a layer 9 based on titanium is again generated. This layer 9 can be discerned as the lighter colouring. It has the same composition as the first layer, layer 4: Ti (C,N). The last layer 10 is a covering layer of aluminium oxide, $Al_2O_3$. The coating procedure takes place in accordance with the following known reaction:

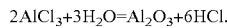

$2AlCl_3+3H_2O=Al_2O_3+6HCl$.

It is claimed:

1. A structural component comprising:
   a substrate, said substrate comprising at least one of a metallic or ceramic material;
   a coating on said substrate, wherein said coating comprises at least a first layer having a first and a second surface, wherein said first surface of said first layer contacts said substrate; a second layer having a first surface and a second surface; and an intermediate layer positioned between said first and said second layer and contacting said second surface of the first layer and said first surface of said second layer, wherein said intermediate layer comprises an elemental metal in the fourth to eighth sub-group of the fourth and fifth period of the Periodic Table and wherein said intermediate layer has a partial layer which comprises the elemental metal which is deposited out of the gas phase.

2. The structural component of claim 1, wherein said intermediate layer comprises a) a dense layer predominantly or exclusively comprising said elemental metal and b) a part layer comprising said elemental metal.

3. The structural component according to claim 1, wherein said intermediate layer is from 0.05 μm to 5 μm thick.

4. The structural component according to claim 1, wherein said element is in the eighth sub-group of the fourth period of the Periodic Table.

5. The structural component according to claim 1, wherein said first and second layers comprise titanium.

6. The structural component according to claim 5, wherein the layers of the coating has a thickness of up to 10 μm.

7. The structural component according to claim 1, wherein one of said first layer and said second layer are covered by an additional layer comprising at least one modification of aluminum oxide.

8. The structural component according to claim 7, wherein the additional layer has a thickness of up to 20 μm.

9. The structural component according to claim 1, wherein said coating has a sequence of at least one of said first, second and intermediate layers comprises titanium and an additional layer comprises aluminum oxide in at least one of the modifications thereof.

10. The structural component according to claim 1, wherein said coating comprises a layer of aluminum oxide in at least one of the α and κ modification and said first and second layer comprise titanium.

11. The structural component according to claim 1, wherein said substrate comprises at least one of silicon nitride and SiAlON.

12. The structural component according to claim 1, wherein said substrate comprises aluminum nitride.

13. The structural component according to claim 1, wherein said substrate comprises $Al_2O_3$.

14. A process for preparing the structural component of claim 1 comprising:
   coating a substrate by applying said first layer to said substrate; applying said intermediate layer to said first layer; and applying said second layer on top of said intermediate layer; wherein said first, second and intermediate layers are applied by a PVD, CVD or plasma-CVD process; wherein said intermediate layer comprises an elemental metal in the fourth to eighth sub-group of the fourth and fifth period of the Periodic Table as a gas phase, wherein deposition of said elemental metal is controlled by process parameters such that said intermediate layer is formed and comprises predominantly or exclusively the metallic or ceramic material and the remainder of said intermediate layer is elemental metal.

15. A process according to claim 14, wherein the quantity of the deposition of the element is controlled by way of varying the pressure.

16. A process according to claim 14, wherein said intermediate layer is formed by reducing the pressure.

17. A process according to claim 14, wherein the thickness of the intermediate layer is controlled by the quantity of the element to be deposited.

18. A process according to claim 14, wherein said intermediate layer has a thickness of from 0.05 µm to 5 µm.

19. A process according to claim 14, wherein said first layer comprise titanium, said second layer comprises titanium or aluminum oxide and an additional layer comprises aluminum oxide in at least one of its modifications.

20. A process according to claim 14, wherein first layer comprises titanium, said second layer comprises titanium and said intermediate layer comprises aluminum oxide in at least one of the α and κ modifications.

21. A process according to claim 14, wherein said first and second layers arc deposited in a thickness of up to 10 microns arid an additional layer is deposited in a thickness of up to 20 microns.

22. A process according to claim 14, wherein said substrate comprises at least one of material selected from the group consisting of silicon nitride, SiAlON, aluminium nitride and $Al_2O_3$.

23. The structural component according to claim 1, further comprising an additional layer comprises aluminum oxide.

24. A process according to claim 1, wherein at least one of said first and second layers comprise titanium.

25. A process according to claim 24, wherein the thickness of at least one of said first and second layers are up to 10 microns.

26. A structural component made of a metallic or ceramic material, in particular for the metal-removing or metal-forming processing of work pieces, and having a coating of hard material, wherein the coating comprises a plurality of layers, and said layers optionally comprise different materials, wherein at least between two layers of the coating an intermediate layer is arranged which comprises predominantly or exclusively a material component of an element in the fourth to eighth sub-group of the fourth and fifth period of the Periodic Table, wherein said intermediate layer comprises a part layer which comprises exclusively said elemental metal wherein said intermediate layer baa a partial layer which comprises the elemental metal which is deposited out of the gas phase.

27. The structural component according to claim 26, wherein said intermediate layer is from 0.05 µm to 5 µm thick.

28. The structural component according to claim 26, wherein said element is an element in the eighth sub-group of the fourth period of 25 the Periodic Table.

29. The structural component according to one of claim 26, wherein the layers of the coating comprise a material based on titanium.

30. The structural component according to claim 29, wherein the thickness of the layer is up to 10 µm.

31. The structural component according to claim 26, wherein said coating is covered by a layer comprising at least one of the modifications of aluminium oxide.

32. The structural component according to claim 31, wherein the thickness of the layer is up to 20 µm.

33. The structural component according to claim 26, wherein the coating comprising a plurality of layers is built up from an alternating sequence of layers based on titanium, and from aluminium oxide in at least one of the modifications thereof.

34. The structural component according to claim 33, wherein a coating of the structural component is built up from a plurality of layers as follows: a plurality of layers based on titanium, a layer of aluminium oxide is in the α or κ modification and optionally one or more covering layers based on titanium, wherein at least between two layers based on titanium an intermediate layer is arranged.

35. The structural component according to claim 26, wherein the substrate material of the structural component is silicon nitride or SiAlON.

36. The structural component according to claim 26, wherein the substrate material 30 of the structural component is aluminium nitride.

37. The structural component according to claim 26, wherein the substrate material of the structural component is a material based on $Al_2O_3$.

38. A process for the application of a coating of hard material to a structural component made of a metallic or ceramic material as the substrate, in particular for the metal-removing or metal-forming processing of work pieces wherein the coating is built up from a plurality of layers, wherein said layers optionally comprise different materials according to claim 26, wherein during application of the layers by a PVD, CVD or plasma-CVD process, at least in one layer an element in the fourth to eighth sub-group of the fourth and fifth period of the Periodic Table is deposited from the gas phase, wherein the deposition is controlled by the process parameters so that with the material component of the deposited element an intermediate layer is formed which comprises predominantly or exclusively said material component, and that this intermediate layer has a part layer which comprises exclusively the elemental metal.

39. The process according to claim 38, wherein the quantity of the deposition of said element is controlled by way of varying the pressure.

40. The process according to claim 39, wherein said intermediate layer is formed by reducing the pressure.

41. The process according to claim 38, wherein the thickness of said intermediate layer is controlled by way of the quantity of the element held in readiness for the deposition.

42. The process according to claim 38, wherein the intermediate layer is built up to a thickness of from 0.05 µm to 5 µm.

43. The process according to claim 38, wherein the case of a coating comprising a plurality of layers on the structural component, in alternating sequence layers based on titanium and layers of aluminium oxide in at least one of the modifications thereof are deposited.

44. The process according to claim 43, wherein the coating of the structural component comprises a plurality of layers first layers based on titanium, followed by a layer of aluminium oxide in the α or κ modification and optionally followed by one or more covering layers based on titanium are applied, and that at least between two layers based on titanium the intermediate layer is deposited.

45. The process according to claim 38, wherein the layers of the coating are deposited in a thickness of up to 20 µm.

46. The process according to claim 38, wherein the coating is preferably deposited on structural components made of silicon nitride, SiAlON, aluminium nitride or $Al_2O_3$.

47. A composition of matter comprising:
a substrate having a coating thereon; wherein said coating comprises
a first layer applied on top of said substrate, said first layer comprising titanium;
an intermediate layer comprising a part layer and a dense layer, wherein said part layer consists of a metal in the fourth to eighth sub-group of the fourth and fifth period of the Periodic Table, wherein said part layer is in contact with said first layer,
a second layer contacting said dense layer, said second layer comprising titanium; and
an outer layer comprising aluminum oxide in at least one of its modifications wherein said intermediate layer has a partial layer which comprises the elemental metal which is deposited out of the gas phase.

48. A structural component comprising:
a substrate comprising a metallic or ceramic material;
a coating on said substrate, wherein said coating comprises at least a first layer having first surface and a second surface, wherein said first surface contacts said substrate;
a second layer having a first and a second surface; and
an intermediate layer positioned between said first and said second layer,
wherein said intermediate layer comprises a dense layer and a partial layer, wherein said partial layer comprises an elemental metal in the fourth to eighth sub-group of the fourth and fifth period of the Periodic Table wherein said intermediate layer has a partial layer which comprises the elemental metal which is deposited out of the gas phase.

49. The structural component of claim 48, wherein said a dense layer contacts said second layer and said part layer contacts said first layer.

50. The structural component of claim 48, wherein said dense layer consists of said metal.

51. The structural component according to claim 48, wherein said first and second layers comprise titanium.

52. The structural component according to claim 49, wherein said first and second layers comprise titanium.

53. The structural component according to claim 50, wherein said first and second layers comprise titanium.

54. The structural component according to claim 48, wherein said coating further comprises an additional layer comprising at least one modification of aluminum oxide.

55. The structural component according to claim 54, wherein the additional layer has a thickness of up to 20 μm.

56. The structural component according to claim 48, wherein said substrate comprises at least one of silicon nitride and SiAlON.

57. The structural component according to claim 48, wherein said substrate comprises aluminum nitride.

58. The structural component according to claim 48, wherein said substrate comprises $Al_2O_3$.

59. A method comprising applying a hard material coating onto a structural component comprising a metallic or ceramic materials as a substrate by depositing out of a gas phase at least one intermediate positioned between two layers of coating to relieve stress between the two layers of coating, wherein the intermediate layer is deposited by depositing an element from, the fourth to eight subgroup of the fourth and fifth period system of elements, wherein the quantity of the deposition of the element is controlled by varying the pressure of the gas phase and of the available quantity of the metallic material component and thereby form a coherent layer or a layer in the form of inclusion regions.

60. A process according to claim 59, wherein said intermediate layer is formed by reducing the pressure.

61. A process according to claim 59, wherein said intermediate layer has a thickness of from 0.05 μm to 5 μm.

62. A process according to claim 59, wherein said first layer comprise titanium, said second layer comprises titanium or aluminum oxide and an additional layer comprises aluminum oxide in at least one of its modifications.

63. A process according to claim 59, wherein first layer comprises titanium, said second layer comprises titanium and said intermediate layer comprises aluminum oxide in at least one of the α and κ modifications.

64. A process according to claim 59, wherein said first and second layers are deposited in a thickness of up to 10 microns and an additional layer is deposited in a thickness of up to 20 microns.

65. A process according to claim 59, wherein said substrate comprises at least one of material selected from the group consisting of silicon nitride, SiAlON, aluminium nitride and $Al_2O_3$.

66. The structural component according to claim 59, further comprising an additional layer comprises aluminum oxide.

67. A process according to claim 59, wherein at least one of said first and second layers comprise titanium.

68. A process according to claim 67, wherein the thickness of at least one of said first and second layers are up to 10 microns.

69. A structural component of a metallic or ceramic material for the chipping machining or transformative working of workpieces, the component comprising a hard material coating, wherein the coating comprises of several layers and the layers may also be comprised of different materials, an intermediate layer is disposed between at least a first and a second layer of the coating to reduce stresses between the layers of the coating and deposited out of the gas phase, wherein the intermediate layers is predominantly or exclusively formed of a material component of an element from the fourth to eighth subgroup of the fourth and fifth period of the periodic system of elements as a function of the parameters set in the coating or of the available quantity of the metallic material as a cohesive layer of the metallic material component and as a part layer of the material component of the first layer and the second layer of the coating or as a pan layer with interstices of the metallic material component.

70. A method for the application of a hard material coating as a substrate on a structural component of a metallic or ceramic material for chipping machining or transformative working of workpieces, wherein the coating comprises several layers and the layers are comprised of different materials, wherein the layers are applied according to a PVD, CVD or plasma CVD method, comprising depositing at least one intermediate layer between two layers to reduce the stress between the two layers in one and the same process step also out of the sante gas phase, wherein this intermediate layer is formed predominantly or exclusively of a material component of an element from the fourth to eighth subgroup of the fourth and fifth period of the periodic system of elements as a function of the parameters set during the coating or of the available quantity of the metallic material components as a cohesive layer of the metallic material component with a succeeding sublayer of the material component of the hard material layers of the coating or as a layer of the material component of the hard material layers of the coating with interstices of the metallic material component.

* * * * *